United States Patent Office 2,903,473
Patented Sept. 8, 1959

2,903,473

PROCESS FOR THE PRODUCTION OF PHENYLCHLOROSILANES

Yasuo Takami, Ota-ku, Tokyo-to, and Tsunao Araki, Kitatama-gun, Tokyo-to, Japan

No Drawing. Application March 14, 1955
Serial No. 494,294

Claims priority, application Japan March 19, 1954

14 Claims. (Cl. 260—448.2)

This invention relates to an improved process for the production of phenylchlorosilanes.

Heretofore, in the process for the production of alkylchlorosilanes or phenylchlorosilanes, it is well-known, for example, as shown in U.S. Patent No. 2,380,995, that silicon and alkylchloride or chlorobenzene are subjected to a contact reaction at a temperature between 230° C. and 550° C. in the presence of copper, silver, a compound capable of producing copper or silver during said reaction, other compounds capable of producing copper or silver when they are heated with silicon in contact therewith, a mixture of two or more said substances, or a mixture of said substance or substances with some other supplementary catalyst. In said reaction, it appears that the reaction result obtained by using alkylchloride is apparently the same as that obtained by using chlorobenzene, but they are actually very different. That is, in the case of alkylchloride, the reaction progresses smoothly and the yield is high, so that the process employing alkylchloride has been actually industrialized. On the contrary, in the case of chlorobenzene, substantial decomposition and side reactions occur and the yield is less than 40%, so that the process employing chlorobenzene has not yet been broadly industrialized. Such a remarkable difference in results as described above is due to the difference between the reaction abilities of alkychlorides and chlorobenzene and to the difference between the stabilities of alkyl radicals and the phenyl radical. Particularly serious disadvantages of the usual processes heretofore in use for the production of phenylchlorosilanes are as follows.

Decomposition of the phenyl radical contained in chlorobenzene occurs violently.

Large amounts of biphenyl and chlorobiphenyls, which are not the desired product, are produced.

The carbon generated by decomposition of the phenyl radical is deposited on the catalyst and the silicon, whereby the reaction abilities of the reactants are reduced. On the other hand, the hydrogen atoms generated simultaneously with said decomposition combine with other active phenyl radicals and form benzene.

Said decomposition of the phenyl radical and consumption of large quantities of phenyl radicals for the production of by-products such as benzene, biphenyl and chlorobiphenyls greatly decreases the yield of phenylchlorosilanes.

The boiling points of biphenyl and chlorobiphenyls are, respectively 165° C. and 182° C., 196° C. at 40 mm. Hg, said boiling points being between the boiling point (105.8° C. at 40 mm. Hg) of phenyltrichlorosilane and the boiling point (207.5° C. at 40 mm. Hg) of diphenyldichlorosilane.

Furthermore, biphenyl and chlorobiphenyls will be solidified at an ordinary temperature, because their melting points are 69.5° C. and 34° C., 75.5° C., respectively, so that they will be deposited on the low temperature parts in the separating apparatus during operation, whereby treatments of the reaction products such as fractional distillation and purification become very complex.

Particularly, it is very difficult from the industrial point of view to subject substantial amounts of the reaction products to a fractional distillation at a reduced pressure.

Therefore, the main object of our invention is to suppress decomposition and side reactions in said reaction, to improve the yield of phenylchlorosilanes, and to simplify the separation of the reaction products.

According to this invention, the usual process for the production of phenylchlorosilanes, which has various disadvantages as above-mentioned, is improved by carrying out the reaction in the presence of zinc, a zinc halide, or their mixture, whereby the above-mentioned object and other objects of this invention are realized.

According to said process of this invention, the following effects can be obtained, said effects not being obtained in the usual process employing no additional catalyst such as zinc, zinc halide or their mixture.

Decomposition of the phenyl radical, deposition of carbon on the silicon and on the catalyst and production of by-products such as benzene, biphenyl, chlorobiphenyls etc. are reduced.

Due to said reduction of carbon deposition and by-product formation which consumes the phenyl radical, the yield of phenylchlorosilanes is greatly improved and in particular it is possible to obtain a high yield which is more than twofold that obtained in the usual process wherein no zinc is used as the additional catalyst.

It has not heretofore been known that in the reaction between silicon and chlorobenzene, zinc acts as an effective inhibitor of decomposition and side reactions.

When chlorobenzene is used for the reaction, an inhibitor effective to suppress decomposition and side reactions is particularly necessary, said necessity being due to the following reasons.

The reactivity of chlorobenzene is inferior to that of alkylchloride, so that when chlorobenzene is used for the reaction, it must be carried out at a reaction temperature higher than that employed in the case of alkylchloride. On the other hand, the phenyl free radical which is produced during the reaction is very unstable in comparison with lower alkyl free radicals, so that when chlorobenzene is used for the reaction, the decomposition of the organic radical, that is, the phenyl radical is much greater than in the case of alkylchloride. Moreover, the ratio of the amount of carbon produced by decomposition of one mol of phenyl radical to the amount of carbon produced by decomposition of one mol of methyl radical is 6, so that much carbon is deposited on the silicon and on the catalyst and their reactivity is reduced, whereby in addition, the second and third decompositions will be induced.

Due to said reasons, when chlorobenzene is used, the yield is very low and industrialization of the process can not be realized. Moreover, among the by-products of said reaction there are substances which solidify at ordinary temperature such as biphenyl and chlorobiphenyls, whereby separation of the reaction products becomes very troublesome as described already, so that for the reaction between silicon and chlorobenzene, an inhibitor which suppresses decomposition and side reactions becomes indispensable.

It has been found by us that zinc has the property of effectively suppressing said decomposition and side reactions in the reaction between silicon and chlorobenzene. But zinc can also exert a peculiar effect in the reaction between alkylchloride and silicon. That is, when zinc is present in the reaction zone, wherein silicon is to be subjected to a reaction with alkylchloride in the presence of a catalyst, alkylchloride reacts directly with zinc and produces alkylzincchloride which in turn acts as an alkylating agent capable of alkylating the alkylchlorosilanes produced, said reaction being reported in J.A.C.S. 67, 1545 (1945). As the result of said reaction, the amount of trialkylchlorosilane which is required as the starting material for the production of silicone oil greatly increases. On the contrary, in the case of chlorobenzene, it does not react directly with zinc, so that zinc does not act as the agent which can phenylate the phenylchlorosilanes but rather acts effectively as an inhibitor capable of suppressing the decomposition and side reactions. Therefore, the amount of triphenylchlorosilane lacking in industrial value does not increase and decomposition and side reactions which accompany consumption of the phenyl radical will be suppressed, whereby the total yield of industrially valuable phenyltrichlorosilane and diphenyldichlorosilane will be greatly improved. On the other hand, it is possible to suppress completely the formation of by-products which solidify such as biphenyl and chlorobiphenyls by suitable selection of the reaction conditions, separation of said substances from the phenylchlorosilanes after reaction being usually very troublesome. Therefore, the separation of the phenylchlorosilanes after reaction becomes very simple.

As is clear from the above description, it is an extraordinary discovery that the process for the production of phenylchlorosilanes can be greatly improved so as to make it industrially attractive by a very simple method which comprises the use of zinc in the reaction zone.

For simplification of the specification, this invention has been described above in connection with the employment of zinc. However, a zinc halide may be used with equal effect in the process of this invention, because zinc can be produced during the reaction by reduction of said zinc halide.

When silicon and chlorobenzene are reacted in the presence of a catalyst, there is no limit in the manner of use of zinc, zinc halide or their mixture in the reaction zone and any convenient manner of use may be adopted. For example, the zinc, zinc halide or their mixture may be introduced into the reaction zone as a mixture with the catalyst and silicon or as a pulverized alloy with silicon, catalyst or any other metal. It is not always necessary to have zinc present in the reaction zone from the commencement of the reaction and zinc may be added to the reaction zone during the course of the reaction.

The amount of the zinc in the reaction zone should be varied in accordance with the kind, character and amount of the catalyst, said amount being the amount containing no halogen in the case of zinc halide, but it is preferable to select said amount to be about from 1% to 30% of the total weight of silicon, zinc and the copper and silver contained in the catalyst and it is more particularly preferable from an industrial point of view to select said amount to be about from 2% to 25% of said total weight. When the amount of zinc is less than 1% of said total weight, the effects thereof are insufficient and the effects due to zinc will almost disappear during the course of the reaction, and decomposition and side reactions will occur. On the other hand, for carrying out the reaction it is actually unnecessary to use zinc in an amount more than 30%, but more than 30% may be used.

The word "catalyst" appearing in this specification means copper, silver, a compound capable of producing copper or silver during the reaction, a compound capable of producing copper or silver by subjecting said compound to heating in contact with silicon, or a mixture of two or more of said materials. And furthermore, to said catalyst may be added any other supplementary catalyst, if necessary.

In the reaction of this invention, for example, copper chloride or copper oxide or the corresponding silver compounds may be employed as the compound capable of producing copper or silver during the reaction or as the compound capable of producing copper or silver by a reaction with silicon during heating therewith.

When copper chloride is heated with silicon at a temperature between 250° C. and 300° C., then silicon tetrachloride and copper are produced. When copper oxide is added in the reaction zone, it is reduced by part of the silicon as well as by the hydrogen produced due to decomposition of the chlorobenzene during reaction, whereby copper is produced. Besides said copper oxide and copper chloride, any other halide or oxide of copper or silver may be used as the compound capable of producing copper or silver. Copper, silver or silicon may be used in the alloyed state.

The product of the reaction of this invention has a hydrolytic character, so that the chlorobenzene to be used should be sufficiently anhydrous. It is not always necessary to use only chlorobenzene and it may be used mixed with other substances.

Examples of such other substance are a diluting agent such as an inert gas, an inert solvent or hydrogen or halide such as alkylchloride, tin chloride, silicon tetrachloride, hydrogenchloride, silicochloroform etc.

Even when the other substance is mixed with chlorobenzene, zinc or zinc halide exerts an effective action for suppressing the decomposition of the phenyl radical and side reactions.

This invention will be more clearly understood from the following examples, wherein all parts are by weight and wherein the yield is designated by using the ratio of phenyl radical to the amount of reacted chlorobenzene, for example, the yield $\eta$ (percent) of phenyltrichlorosilane is as follows:

$$\eta(\text{percent}) = \left[ \frac{\text{weight of phenyltrichlorosilane produced} \times \frac{\text{molecular weight of chlorobenzene}}{\text{molecular weight of phenyltrichlorosilane}}}{\text{weight of chlorobenzene used} - \text{weight of chlorobenzene recovered}} \right] \times 100$$

*Example 1*

A reaction tube was filled with tablets prepared by pressing a mixture of 130 parts of commercial metallic silicon and 118 parts of brass powder containing 16% zinc at a pressure of about 1.5 ton per cm.$^2$, said silicon being crushed so as to be about 300 mesh.

Through said tube was passed 285 g. of completely dried chlorobenzene for 26 hours while heating said tube at a temperature between about 400° C. and 480° C.

The distillate removed from the outlet of said reaction tube was condensed by water cooling. Said condensed distillate was subjected to a fractional distillation, whereby 147.2 g. of unreacted chlorobenzene was recovered. From the remaining part, 7.5 g. of benzene, 25.3 g. of phenyltrichlorosilane, 83.0 g. of diphenyldichlorosilane and 8 g. of high boiling substance containing a small amount of triphenylchlorosilane were obtained. No biphenyl and chlorobiphenyls were found. The yield of phenyltrichlorosilane and of diphenyldichlorosilane was 9.8% and 53.6%, respectively. The total yield of said phenylchlorosilanes was at least 63.4%. The yield of phenylchlorosilanes in the usual reaction between silicon and catalyst has been within the range of 9% to 44%, said yield being much lower than that of this example.

*Example 2*

A reaction tube was filled with a mixture of 100 parts of commercial metallic silicon powder, 100 parts of reduced copper powder and 25 parts of zinc powder. Through said tube was passed 545 g. of chlorobenzene for 51 hours at a constant speed while heating said tube at a temperature between 430° C. and 445° C. The distillate removed from the outlet of said reaction tube was condensed by water cooling. Said condensed distillate was subjected to a fractional distillation, whereby 274 g. of unreacted chlorobenzene was recovered. From the remaining part, 16.9 g. of benzene, 47.2 g. (yield 9.3%) of phenyltrichlorosilane, 167.4 g. (yield 54.9%) of diphenyldichlorosilane, a trace of biphenyl and chlorobiphenyls and 9 g. of high boiling substance containing a small amount of triphenylchlorosilane were obtained. The total yield of phenylchlorosilanes was at least 64.2%.

When said reaction was carried out under the same conditions as above, but without adding zinc, the yield of phenyltrichlorosilane and of diphenyldichlorosilane was 22.6% and 15.2%, respectively and the total yield was only 37.8%. Moreover, 42.3 g. of benzene, 36.1 g. of biphenyl and chlorobiphenyls and 8 g. of high boiling substance containing a small amount of triphenylchlorosilane were obtained.

Example 3

A reaction tube was filled with a mixture of 105 parts of commercial silicon powder, 10 parts of ferrosilicon containing 15% iron, 105 parts of copper powder having a copper oxide film thereon, 4 parts of zinc powder and 4 parts of anhydrous zinc chloride. Through said tube was passed 348 g. of chlorobenzene for 32 hours at a constant speed while heating said tube at a temperature between 440° C. and 450° C.

The distillate removed from the outlet of said reaction tube was condensed by water cooling. Said condensed distillate was subjected to a fractional distillation, whereby 162.6 g. of unreacted chlorobenzene was recovered. From the remaining part, 52.3 g. of phenyltrichlorosilane, yield 15%, and 73.4 g. of diphenyldichlorosilane, yield 35.2%, were obtained. The total yield was 50.2% which is about 1.4 times that in a similar reaction wherein zinc and zinc halide are not present.

On the other hand, the weights of benzene and biphenyl were, respectively, ⅔ and ⅖ of those in a similar reaction wherein zinc and zinc chloride are not present.

Example 4

A reaction tube was filled with a mixture of 80 parts of silicon powder, 50 parts of cuprous chloride, 48 parts of copper powder having an oxide film thereon and 40 parts of zinc.

Through said tube was passed chlorobenzene at a constant speed while heating said tube at a temperature between 430° C. and 470° C. to subject said mixture to a contact reaction. After 22 hours from commencement of said reaction, 297 g. of chlorobenzene was passed through said reaction tube for 28 hours.

The distillate removed from the outlet of said tube was condensed by water cooling. Said condensed distillate was subjected to a fractional distillation, whereby 133.1 g. of unreacted chlorobenzene was recovered. From the remaining part, 15.5 g. of phenyltrichlorosilane, yield 5%, and 110.6 g. of diphenyldichlorosilane, yield 60%, were obtained.

The total yield was 65% and biphenyl and the like were not found.

Example 5

A reaction tube was filled with a mixture of 200 parts of silicon powder, 130 parts of silver powder, 20 parts of silver oxide and 8 parts of zinc powder. Through said tube was passed 260 g. of chlorobenzene for 40 hours to subject said mixture to a contact reaction with chlorobenzene while heating said tube at a temperature between 420° C. and 460° C. The distillate removed from the outlet of said tube was condensed by water cooling. Said condensed distillate was subjected to a fractional distillation, whereby 193.2 g. of unreacted chlorobenzene was recovered.

From the remaining part, 9.2 g. of phenyltrichlorosilane, yield 7.3%, and 23.5 g. of diphenyldichlorosilane, yield 31.3%, were obtained. The total yield was 38.6% which is 1.2 times the value obtained when no zinc is used. Biphenyl and the like were not found at all.

Example 6

A reaction tube was filled with tablets prepared by pressing a mixture of 120 parts of silicon powder, 100 parts of copper powder, 20 parts of zinc powder and 2 parts of iron powder.

Through said tube was passed a mixture of 168.2 g. of chlorobenzene, 30.2 g. of tin tetrachloride and 7.2 liters of hydrogen for 16 hours while heating said tube at a temperature between 438° C. and 445° C. The distillate removed from the outlet of said tube was condensed by water cooling.

Said condensed distillate was subjected to a fractional distillation, whereby 53.2 g. of chlorobenzene was recovered. From the remaining part, 7.4 g. of benzene, 60.5 g. of phenyltrichlorosilane, yield 28%, and 36.2 g. of diphenyldichlorosilane, yield 28%, were obtained.

Biphenyl and the like were not found. The total yield was 56%. Said high yield cannot be obtained when no zinc is employed.

Example 7

A reaction tube was filled with a mixture of 100 parts of silicon powder (analysis data: silicon—92.6%, iron—3.8%, aluminium—1.1%, calcium and carbon—traces), 100 parts of copper powder (analysis data: copper—98.1%, iron—0.6%) and 30 parts of zinc powder. Through said tube was passed a mixture of 171.0 g. of chlorobenzene and 22.2 g. of silicon tetrachloride for 18 hours to subject said mixture to a contact reaction with silicon while heating said tube at a temperature between 435° C. and 445° C. The distillate was subjected to a fractional distillation, whereby unreacted chlorobenzene of 61 g. and silicon tetrachloride were recovered.

From the remaining part, 10.7 g. of benzene, 56.7 g. of phenyltrichlorosilane, yield 27.4%, and 30.3 g. of diphenyldichlorosilane, yield 24.5%, were obtained and biphenyl and the like were not found at all.

The total yield was 51.9%. On the contrary, when said reaction was carried out under similar reaction conditions but without employing zinc, the yield of phenyltrichlorosilane and of diphenyldichlorosilane was 24% and 15.1%, respectively and 13.0 g. of benzene and 4.1 g. of biphenyl and chlorobiphenyls were obtained.

In this example, ferrosilicon containing iron of 15% may be used in place of silicon powder with the same effect.

Since it is obvious that many changes and modifications can be made in the above-described details without departing from the nature and spirit of this invention, the invention is not limited to said examples and details.

We claim:

1. The method of inhibiting side reactions and decomposition in the production of phenylchlorosilanes from the direct interaction chlorobenzene and silicon with the silicon atoms in said phenylchlorosilanes being supplied by said silicon which comprises effecting the reaction between said chlorobenzene and said silicon while said reactants are intimately associated with a small but effective amount of an inhibitor selected from the group consisting of zinc, halides of zinc, and mixtures thereof.

2. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting the reaction between said chlorobenzene and said silicon in a reaction mass comprising a catalyst for the reaction selected from the group consisting of copper, silver, their oxides, their halides, and mixtures thereof, and an inhibitor selected from the group consisting of zinc, halides of zinc, and mixtures thereof, the zinc contained in the inhibitor being present in an amount more than 1% by weight of the sum of said silicon, the metal in said catalyst, and said zinc.

3. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting the reaction between said chlorobenzene and said silicon in a reaction mass comprising copper and zinc, the zinc being present in an amount more than 1% by weight of the sum of said silicon, said copper, and said zinc.

4. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting the reaction between said chlorobenzene and said silicon in a reaction mass comprising a powdered alloy of copper and zinc, the zinc being present in an amount more than 1% by weight of the sum of said silicon, said copper, and said zinc.

5. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting the reaction between said chlorobenzene and said silicon in a reaction mass comprising a powdered alloy of copper and zinc, and zinc, the zinc being present in an amount more than 1% by weight of the sum of said silicon, said copper, and said zinc.

6. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting the reaction between said chlorobenzene and said silicon in a reaction mass comprising copper in the form of an alloy with said silicon, and zinc, the zinc being present in an amount more than 1% by weight of the sum of said silicon, said copper, and said zinc.

7. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises introducing said chlorobenzene into a reaction mass comprising an alloy of silicon, copper, and zinc, the zinc being present in an amount more than 1% by weight of the sum of said silicon, said copper, and said zinc.

8. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises bringing chlorobenzene and hydrogen into contact with silicon in a reaction mass comprising a catalyst for the reaction selected from the group consisting of copper, silver, their oxides, their halides, and mixtures thereof, and an inhibitor selected from the group consisting of zinc, halides of zinc, and mixtures thereof, the zinc contained in the inhibitor being present in an amount more than 1% by weight of the sum of said silicon, the metal in said catalyst, and said zinc.

9. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises bringing chlorobenzene and a chloride selected from the group consisting of an alkylchloride, chlorides of tin, silicochloroform, silicon tetrachloride, and mixtures thereof into contact with silicon in a reaction mass comprising a catalyst for the reaction selected from the group consisting of copper, silver, their oxides, their halides, and mixtures thereof, and an inhibitor selected from the group consisting of zinc, halides of zinc, and mixtures thereof, the zinc contained in the inhibitor being present in an amount more than 1% by weight of the sum of said silicon, the metal in said catalyst, and said zinc.

10. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises bringing a mixture of chlorobenzene and silicon tetrachloride into contact with a reaction mass comprising silicon, copper, and zinc, the zinc being present in an amount more than 1% by weight of the sum of said silicon, said copper, and said zinc.

11. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting reaction between heated silicon and a mixture of chlorobenzene and silicon tetrachloride in the presence of a powdered alloy of copper and zinc, the zinc being present in an amount more than 1% by weight of the sum of said silicon, said copper, and said zinc.

12. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises effecting reaction between heated silicon and a mixture of chlorobenzene and silicon tetrachloride in the presence of a powdered alloy of copper and zinc, and zinc, the zinc being present in an amount more than 1% by weight of the sum of said silicon, said copper, and said zinc.

13. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises bringing a mixture of chlorobenzene and silicon tetrachloride into contact with an alloy of silicon and copper in the presence of zinc, the zinc being present in an amount more than 1% by weight of the sum of said silicon, said copper, and said zinc.

14. The method of inhibiting side reactions and decomposition and obtaining increased yields of phenylchlorosilanes from the direct interaction of chlorobenzene and silicon with the silicon atoms in said phenylchlorosilanes being supplied by said silicon which comprises bringing a mixture of chlorobenzene and silicon tetrachloride into contact with an alloy of silicon, copper and zinc, the zinc being present in an amount more than 1% by weight of the sum of said silicon, said copper, and said zinc.

References Cited in the file of this patent

UNITED STATES PATENTS

| | | |
|---|---|---|
| 2,427,605 | Hurd | Sept. 16, 1947 |
| 2,464,033 | Gilliam | Mar. 8, 1949 |
| 2,759,960 | Nishikawa et al. | Aug. 21, 1956 |

FOREIGN PATENTS

| | | |
|---|---|---|
| 708,823 | Great Britain | May 12, 1954 |
| 908,019 | Germany | Apr. 1, 1954 |
| 1,131,887 | France | Oct. 29, 1956 |

OTHER REFERENCES

Rochow et al.: Jour. Am. Chem. Soc., vol. 67 (1945), pp. 1772–74.